United States Patent [19]

Shimizu

[11] 3,986,443

[45] Oct. 19, 1976

[54] COOKING MACHINE

[76] Inventor: Yasuhiro Shimizu, 31-12 Awakubo, Isehara, Kanagawa, Japan

[22] Filed: Apr. 8, 1975

[21] Appl. No.: 566,627

[30] Foreign Application Priority Data

Apr. 15, 1974 Japan................................. 49-41074
Apr. 15, 1974 Japan................................. 49-41075

[52] U.S. Cl.................................... 99/334; 99/424; 99/443 C
[51] Int. Cl.². ........................................ A47J 37/10
[58] Field of Search ............ 99/334, 352, 423, 424, 99/427, 443 C, 448

[56] References Cited
UNITED STATES PATENTS

| | | | |
|---|---|---|---|
| 1,455,923 | 5/1923 | Mininberg | 99/352 |
| 1,471,727 | 10/1923 | Gomez | 99/423 |
| 1,847,752 | 3/1932 | Coleman | 99/423 |

FOREIGN PATENTS OR APPLICATIONS

| | | | |
|---|---|---|---|
| 84,204 | 9/1954 | Norway | 99/423 |

Primary Examiner—Billy J. Wilhite
Attorney, Agent, or Firm—Lane, Aitken, Dunner & Ziems

[57] ABSTRACT

There is provided a machine for automatically and rapidly cooking or frying food. A plurality of frying pans are carried by a movable platform. A motor moves the platform relative to a feeder or trough. Responsive to the movement of the platform, raw food, such as raw eggs, is supplied from the feeder or trough into the frying pans.

4 Claims, 8 Drawing Figures

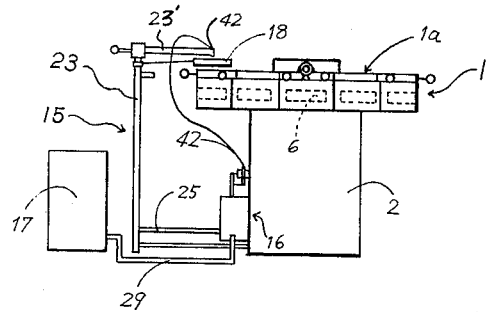
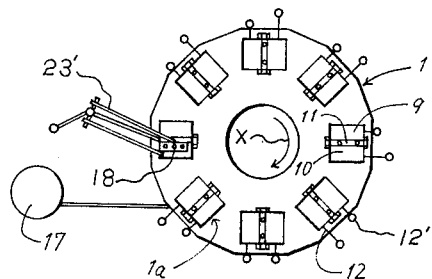
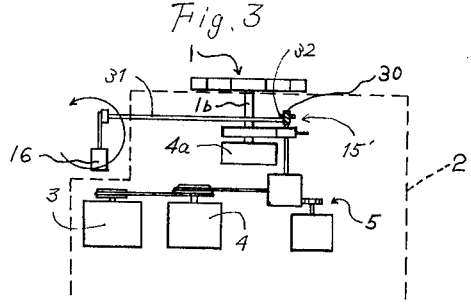
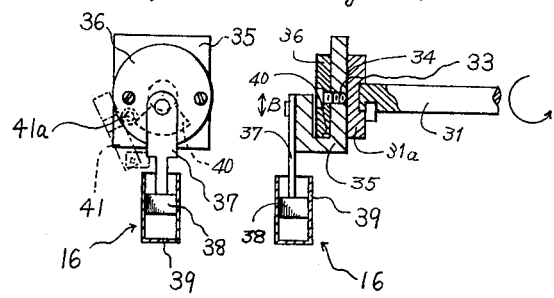

COOKING MACHINE

BACKGROUND OF THE INVENTION

This invention relates to a cooking machine and more particularly to a machine for frying food such as eggs.

It has been a conventional practice both in home and business to fry eggs by hand. It is extremely inconvenient for the mass-production of the fried eggs.

SUMMARY OF THE INVENTION

According to the invention, there is provided a machine for automatically and rapidly cooking or frying food. The machine includes a movable platform carrying a plurality of cooking containers or plates; dispensing means for selectively charging the cooking containers or plates with a raw food to be cooked; means for moving the platform relative to the dispensing means; means responsive to the movement of the platform for supplying the raw food to the dispensing means; and means for heating each of the cooking containers or plates.

Therefore, it is an object of the invention to provide a machine for automatically and rapidly cooking food.

It is a further object of the invention to provide a machine which may fry a great number of eggs and/or other foods within a very short time.

The above mentioned and further objects, features and advantages of the invention will become more apparent from the following description when taken in conjunction with the accompanying drawings.

BRIEF DESCRIPTION OF THE DRAWINGS

FIG. 1 is a side elevational view of one embodiment of the machine of this invention;

FIG. 2 is a top plan view of the machine shown in FIG. 1;

FIG. 3 is a schematic view showing the interior construction of the embodiment of FIG. 1;

FIG. 4 (A) is an enlarged and detailed side view, partly in cross-section, of the portion encircled in FIG. 3;

FIG. 4(B) is an end view, partially in cross-section, of the machine portion of FIG. 4(A);

DETAILED DESCRIPTION OF THE EMBODIMENTS

Figure 5:
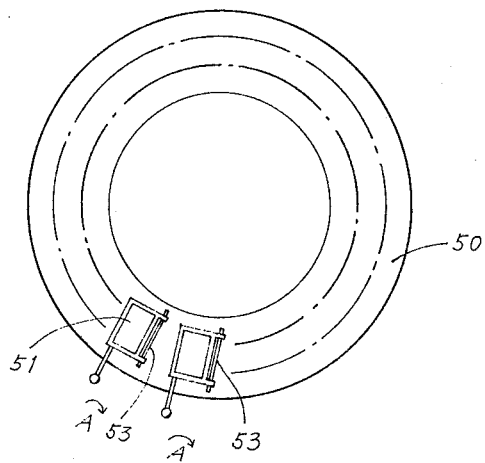
FIG. 5 is a top plan view of another embodiment of the invention.

Referring now to the drawings, FIG. 1 illustrates a preferred embodiment of the invention. Numeral 1 designates generally a platform which supports a plurality of frying pans 1a. As shown in FIG. 3, the platform 1 is mounted on a shaft 1b, which is rotatably mounted in base 2. A motor 3, provided in the base 2, is adapted to rotate the shaft 1b and the platform 1 at a given speed. The motor 3 is connected to the shaft 1b through change gear 4, reduction gear 5, and a supporter 4a for the shaft 1b.

In FIG. 1, housed in the lower portion of the platform 1 are a plurality of heat sources 6, e.g. gas burners or electrical heating elements, only one of which is illustrated for convenience. The number of the heat sources 6 is preferably same as the number of the frying pans 1a. The heat sources 6 rotate with the platform 1 in the direction of arrow X. (FIG. 2).

Referring to FIG. 2, it is preferable that each of the frying pans 1a consists of a pair of plates or pan sections 9 and 10. The plates or pan sections 9 and 10 are pivotally connected by a hinge member 11. Fixed to the plates or pan sections 9 and 10 are handles 12 and 12' which differ from each other in length.

In FIG. 1, numeral 15 designates generally means for selectively supplying into each frying pan 1a a raw food material in a given quantity. The food material may be a mixture of raw eggs and/or other food. The supplying means 15 includes a tank 17 for holding the raw food to be fried; pipe sections 29, 25, 23 and 23'; a feeder or trough 18 having a plurality of bottom openings for dispensing the raw food into the frying pans 1a; and a pump 16 for transferring the raw food from the tank 17 to the feeder 18. It is preferable that the pump 16 is actuated responsive to the movement or rotation of the platform 1. The pump 16 feeds the raw food through the pipe sections 25, 23 and 23' to charge the feeder or trough 18. The terminal end of the pipe section 23' is positioned above a predetermined location at which each individual frying pan 1a is supplied with the raw food to be cooked or fried. The feeder 18 is supported by the pipe section 23'. The feeder 18 is connected to one end of a supply pipe 25. The opposite end of the supply pipe 25 is connected to the outlet of the pump 16 which is positioned on or near the side of the base 2. The inlet of the pump 16 is connected to pipe section 29 which in turn is connected to the outlet of the tank 17. The raw food is supplied from the tank 17 via the pipe section 29, the pump 16, the pipe section 25, and the feeder 18 into a selected frying pan 1a.

Referring to FIG. 3, a drive shaft 15' is connected at one end thereof to the reduction gear 5 and carries at its opposite end a drive gear 30 which is engaged with a driven gear 32 mounted on one end of a shaft 31 with a gear ratio of 1:1. The shaft 31 is rotatably mounted in a horizontal position within the base 2.

Referring to FIG. 4, the left end of the shaft 31 is connected to a transmission member 31a which projects laterally from the side wall of the base 2. The member 31a is formed with a groove 34. A crank 35 is attached to the groove 34 by means of a positioning member 36 and a bolt 33. A rod 37 connects the crank 35 to a piston 38 in the pump 16 in order to reciprocate the piston 38 in a cylinder 39 responsive to the rotation of the shaft 31. The point at which the crank 35 and the rod 37 is connected to each other is declined from the axis of the shaft 31. The distance between the connecting point and the axis of the shaft 31 may be regulated by adjusting the bolt 33 in the direction of arrow B. An arched cam 40 is adjacent to the member 31a. The cam 40 is engaged with a follower 41a attached to a lever 41.

In FIG. 1, a wire 42 connects the lever 41 to the feeder 18. The lever 41 intermittently pulls the wire 42 to permit the opening and closing movement of the valve (not shown) of the feeder 18 or the rotation thereof, whereby the raw food may be supplied from the feeder 18 into a selected frying pan 1a.

In operation, the motor 3 is started after the frying pans are sufficiently heated by the heat sources 6. The platform 1 is rotated by the motor 3. At the same time, the shaft 31 is rotated. As a result, the piston 38 in the pump 16 is reciprocated while the lever 41 is moved. Whenever the platform 1 is turned by a given angle, the raw food is supplied from the tank 17 of the feeder 18 for function of the reciprocal movement of the piston 38. After that, it is further supplied into a selected frying pan 1a by the opening movement of the valve (not shown) of the feeder 18. This opening movement of the valve is caused because the lever 41 pulls the wire 42. One reciprocal cycle of the piston 38 and the lever 41 may be complete whenever the platform 1 is turned by a given angle which corresponds to the distance between the frying pans 1a. The same operation as abovementioned may continue in sequence.

Figure 6:
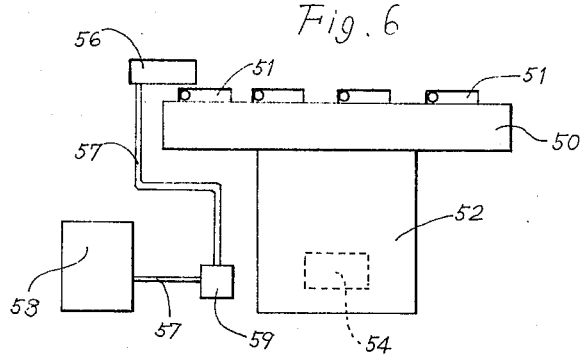
FIG. 6 is a side elevational view of the embodiment of FIG. 5.
Figure 7:
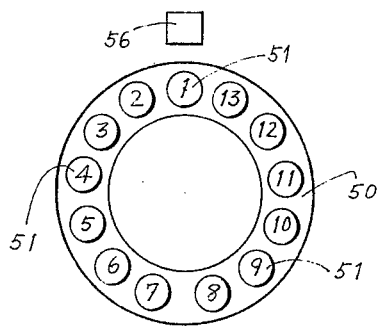
FIG. 7 is a schematic view of a preferred arrangement of the frying pans which may be used with the machine of FIG. 5.

FIGS. 5, 6, and 7 illustrate a modified embodiment of the invention. A platform 50 is rotatably mounted upon a base 52. A plurality of frying pans 51, only two of which are shown in FIG. 5 for convenience, are attached to the top surface of the platform 50. Each frying pan 51 of box type is rotatable around individual bars 53 in the direction of arrow A. In this embodiment, the number of the frying pans 51 is odd. Any odd number may be employed.

Referring to FIG. 6, a motor 54 is housed within the base 54 to rotate the platform 50 around its axis. The motor 54 and the platform 50 are connected through well-known driving mechanism (not shown).

A feeder 56 is positioned just above a predetermined course of the frying pans 51 so that the raw food may be supplied into a selected frying pan 51. The raw food, which may be a mixture of raw eggs and/or other food, is stored in a tank 58 and, if needed, transferred therefrom via a pipe 57, a pump 59 and a pipe 57' into the feeder 56.

The operation of the machine as shown in FIGS. 5 and 6 will now be explained particularly with reference to the schematic view in FIG. 7. One cycle of the operation to fry a thick food of four layers is accomplished as follows:

First - to supply the raw food into the frying pans No. 1, No. 3, No. 5, No. 7 No. 9, No. 11, and No. 13 in order;

Second - to supply the raw food into the frying pans No. 2, No. 4, No. 6, No. 8, No. 10, and No. 12 in order;

Third to transfer the fried food of one layer from the frying pan No. 1 to No. 2, by turning up former around its axis, whereby the fried food may be of two layers, thereafter supplying the raw food again into the empty frying pan No. 1; and further in the same way, transfer every alternate fried foods of one layer from the frying pans No. 3, No. 5, No. 7, No. 9, No. 11 and No. 13 to the adjacent frying pans No. 4, No. 6, No. 8, No. 10, No. 12 and No. 1 in order, respectively, as well as to supply sequentially the raw food into the empty frying pans;

Fourth - to transfer every alternate fried foods of two layers from the frying pans No. 2, No. 4, No. 6, No. 8, No. 10, and No. 12 to the adjacent frying pans No. 3, No. 5, No. 7, No. 9, No. 11 and No. 13, respectively, so that the fried food may be of three layers, as well as to supply sequentially the raw food into the empty frying pans; and Fifth - to transfer every alternate fried foods from the frying pans No. 1, No. 3, No. 5, No. 7, No. 9, and No. 11 to the adjacent frying pans No. 2, No. 4, No. 6, No. 8, No. 10 and No. 12 as well as to supply the raw food into the empty frying pans.

As a result, the fried foods of four layers may be obtained in the frying pans No. 2, No. 4, No. 6, No. 8, No. 10 and No. 12.

According to this invention, only one operator can fry a great number of foods such as eggs within a very short time at the same working point.

While the described embodiments represent the preferred forms of this invention it is to be understood that modifications will occur to those skilled in the art without departing from the spirit of the invention. For example, in place of the pure mechanical mechanism as above described, supplying of the raw food from the feeder into the frying pans may be controlled by other means such as switching system, photoelectro system, electromagnetic system, or air cylinder system.

What is claimed is:

1. A cooking apparatus comprising:
   a generally circular movable platform carrying a plurality of cooking pans or plates, each of said pans or plates being provided with hinge means for pivotal movement with respect to the top surface of said platform, said hinge members being alignable radially with respect to said platform to allow each of said pans or plates to be turned over toward an adjacent pan or plate;
   dispensing means for selectively charging said cooking containers or plates with a raw food to be cooked;
   means for moving said platform relative to said dispensing means;
   means responsive to the movement of said platform for supplying the raw food to said dispensing means; and
   a plurality of heat sources, each of said heat sources being associated with and movable with one of said cooking pans or plates.

2. The apparatus as defined in claim 1, wherein said platform is of doughnut type and rotated by said moving means.

3. the apparatus of claim 1 wherein the number of said pans or plates is odd.

4. The apparatus of claim 1 wherein said pans or plates are arranged at regular intervals.

* * * * *